(12) United States Patent
Ciepluch et al.

(10) Patent No.: US 12,173,513 B2
(45) Date of Patent: Dec. 24, 2024

(54) SOLID SURFACE MATERIAL

(71) Applicant: Vendura Industries, LLC, Franklin, WI (US)

(72) Inventors: Mark Ciepluch, Muskego, WI (US); Michelle Kartman, Middleton, WI (US); David Rusher, Portage, WI (US)

(73) Assignee: Vendura Industries Inc., Franklin, WI (US)

( * ) Notice: Subject to any disclaimer, the term of this patent is extended or adjusted under 35 U.S.C. 154(b) by 185 days.

(21) Appl. No.: 17/943,316

(22) Filed: Sep. 13, 2022

(65) Prior Publication Data
US 2023/0085915 A1 Mar. 23, 2023

Related U.S. Application Data

(60) Provisional application No. 63/246,994, filed on Sep. 22, 2021.

(51) Int. Cl.
| | |
|---|---|
| *E04F 13/18* | (2006.01) |
| *B29B 7/90* | (2006.01) |
| *B29C 39/00* | (2006.01) |
| *B29C 39/10* | (2006.01) |
| *B29C 39/12* | (2006.01) |
| *B29C 39/22* | (2006.01) |
| *B29K 67/00* | (2006.01) |

(Continued)

(52) U.S. Cl.
CPC ............ *E04F 13/185* (2013.01); *B29B 7/90* (2013.01); *B29C 39/003* (2013.01); *B29C 39/10* (2013.01); *B29C 39/12* (2013.01); *B29C 39/22* (2013.01); *B29K 2067/00* (2013.01); *B29K 2105/16* (2013.01); *B29K 2995/002* (2013.01); *B29L 2031/10* (2013.01)

(58) Field of Classification Search
None
See application file for complete search history.

(56) References Cited

U.S. PATENT DOCUMENTS

| 1,871,563 A | 8/1932 | Ericson |
|---|---|---|
| 4,307,140 A | 12/1981 | Davis |
| 4,525,965 A | 7/1985 | Woelfel |

(Continued)

FOREIGN PATENT DOCUMENTS

| EP | 1561568 A1 * | 8/2005 | ............ B29C 63/02 |
|---|---|---|---|
| ES | 2332633 B1 | 2/2010 | |

(Continued)

OTHER PUBLICATIONS

Dholakiya—Unsaturated polyester resin for specialty applications—2012 (Year: 2012).*

(Continued)

*Primary Examiner* — John Vincent Lawler

(57) ABSTRACT

A solid surface material apparatus and process is disclosed which comprises a first solid material comprising acrylic modified polyester resin, at least one natural mineral filler, and at least one colorant and/or at least one granule configured in a sheet with at least one channel cut into the top surface of it and a second solid surface material comprising an acrylic modified polyester resin, at least one natural mineral filler, and at least one colorant and/or at least one granule which at least partially fills the at least one channel of the first solid surface material.

11 Claims, 4 Drawing Sheets

(51) Int. Cl.
  *B29K 105/16*   (2006.01)
  *B29L 31/10*   (2006.01)

(56) References Cited

U.S. PATENT DOCUMENTS

| | | |
|---|---|---|
| 6,878,782 B2 | 4/2005 | Merfeld et al. |
| 8,353,144 B2 | 1/2013 | Bolin |
| 10,246,837 B2 | 4/2019 | Lorenz |
| 2004/0175451 A1* | 9/2004 | Maekawa ............... B29C 41/46 425/375 |
| 2008/0115437 A1 | 5/2008 | Bordener |
| 2013/0315666 A1 | 11/2013 | Baumgartner et al. |
| 2017/0254093 A1 | 9/2017 | Bolin |
| 2018/0051471 A1 | 2/2018 | Goldsmith |

FOREIGN PATENT DOCUMENTS

| | | | |
|---|---|---|---|
| RU | 2696689 C1 | 8/2019 | |
| WO | WO 2001/045615 A1 * | 6/2001 | ............. A61F 13/15 |

OTHER PUBLICATIONS

Vendura, Latitile Wall Systems, https://www.vendura.com/latitile-wall-systems, Published Oct. 21, 2020, Accessed Aug. 27, 2022.

* cited by examiner

SOLID SURFACE MATERIAL

CROSS REFERENCE TO RELATED APPLICATIONS

U.S. Provisional application No. 63/246,994, filed on Sep. 22, 2021.

BACKGROUND OF THE INVENTION

1. Field of the Invention

Embodiments of the present disclosure relate generally to building materials, and more specifically to moldable solid surface materials used for adhesion to walls, floors, or ceilings.

2. Background

Tiling a floor or wall when building or renovating a home or business is extremely common and requires at least one individual to manually set and place tiles using a grout backing, followed by infilling joints between each tile. This is a laborious and costly process as well as requires maintenance to repair cracked grout. Solutions such as tileboard and gel-coated solutions have been developed in an attempt to streamline and reduce the cost and maintenance of tiling. Tileboard is a sheet of fiberboard with a plastic coating to resemble tile (generally comprised of primarily natural materials such as ceramic or man-made material such as solid surface materials) in an attempt to give the appearance of tile without actually being tile. While tileboard is inexpensive compared to traditional tile, there are a number of drawbacks to tileboard and gel-coated solutions including ineffective visual representation, inability to clean (as tileboard is often not made from ceramic or solid surface materials), as well as a greatly reduced material life. A solution is needed that is a single solid surface material but which also gives the appearance of a manually tiled surface (including tiles and grout), is cleanable, and has an extended useful life, and can be installed quickly by a lay person.

SUMMARY OF THE INVENTION

An object of the invention is to provide a solid surface material which appears as though it is two or more distinct materials with preferably difference coloring (that is, as if the material is actually a traditionally tiled surface).

An additional object of the invention is to provide a solid surface material which does not require regular maintenance or skilled labor to install.

In accordance with a first embodiment, the invention relates to a material which comprises a first solid material comprising acrylic modified polyester resin, at least one natural mineral filler, and at least one colorant and/or at least one granule configured in a sheet formation with at least one channel cut into the top surface of it and a second solid surface material comprising an acrylic modified polyester resin, at least one natural mineral filler, and at least one colorant and/or at least one granule which at least partially filling the at least one channel of the first solid surface material.

In accordance with a second embodiment, the invention relates to a process which comprises the steps of adding a first quantity of resin, inert filler, and colorant and/or granules to a mixing bowl to and mixing the ingredients to create a first mixture; then adding and mixing a catalyst into the mixing bowl. The next step includes pouring the first mixture from the mixing bowl into a mold and allowing the first mixture to cure. Next, the cured first mixture is removed from the mold, sanded, and at least one channel is cut into the top surface of the cured first mixture. The next step includes forming a second mixture by adding and mixing a second quantity of resin, inert filler, and colorant and/or granules to the a mixing bowl, followed by the addition of a catalyst followed by further mixing of the second mixture. Finally, the second mixture is poured into the at least one channel in the top surface of the first cured mixture and the second mixture is allowed to cure.

DETAILED DESCRIPTION OF THE INVENTION

For the following defined terms, these definitions shall be applied, unless a different definition is given in the claims or elsewhere in this specification. All numeric values are herein assumed to be modified by the term "about," whether or not explicitly indicated. The term "about," in the context of numeric values, generally refers to a range of numbers that one of skill in the art would consider equivalent to the recited value (e.g., having the same function or result). In many instances, the term "about" may include numbers that are rounded to the nearest significant figure. Other uses of the term "about" (e.g., in a context other than numeric values) may be assumed to have their ordinary and customary definition(s), as understood from and consistent with the context of the specification, unless otherwise specified.

As used in this specification and the appended claims, the singular forms "a," "an," and "the" include plural referents unless the content clearly dictates otherwise. As used in this specification and the appended claims, the term "or" is generally employed in its sense including "and/or" unless the content clearly dictates otherwise. It is to be noted that in order to facilitate understanding, certain features of the disclosure may be described in the singular, even though those features may be plural or recurring within the disclosed embodiment(s). Each instance of the features may include and/or be encompassed by the singular disclosure(s), unless expressly stated to the contrary.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

Figure 1:
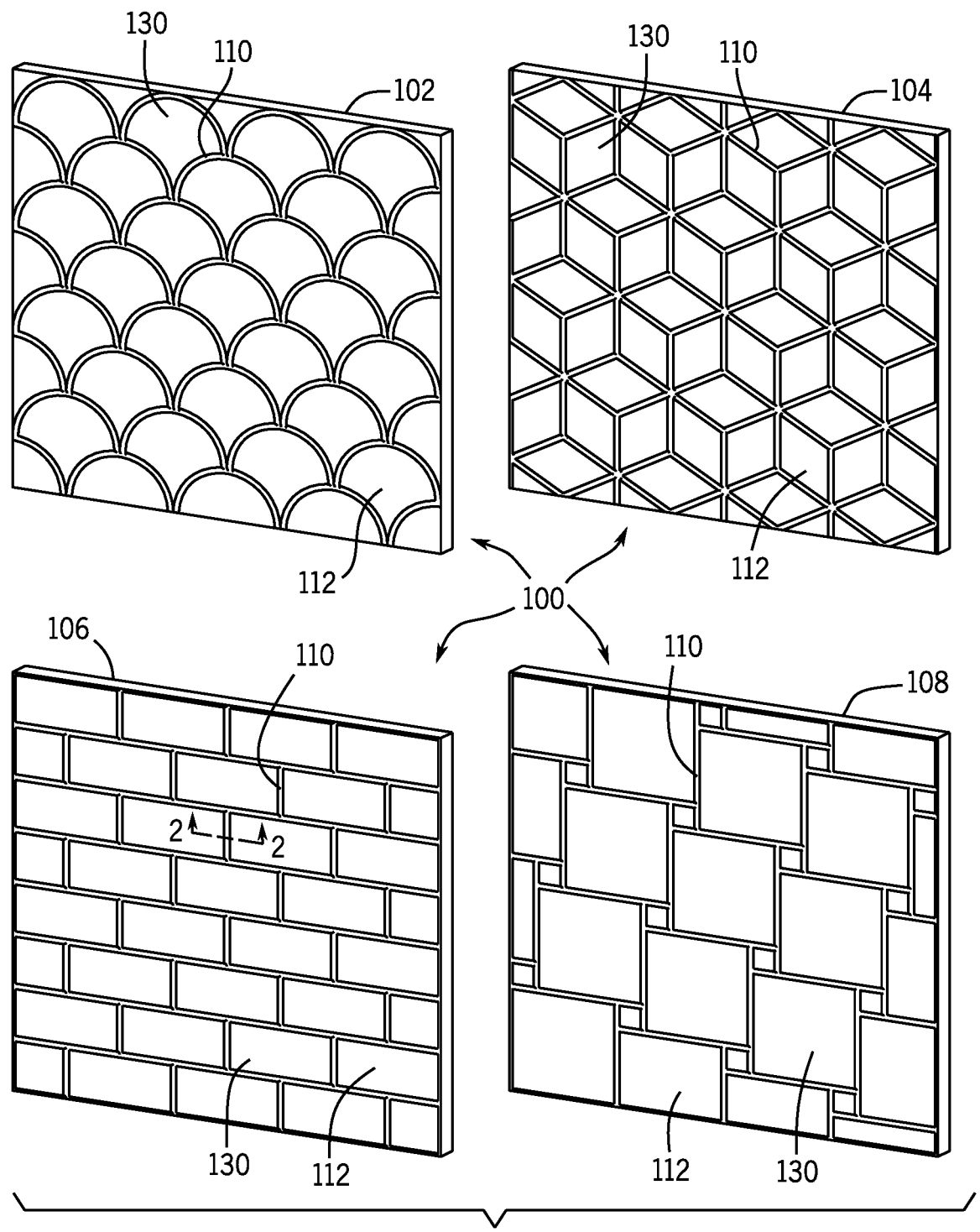
FIG. 1 is a partial perspective view of four embodiments of the present invention.

A solid surface material will now be described with references in FIGS. 1-4. Turning to the drawings, where the reference characters indicate corresponding elements throughout the several figures, attention is first directed to FIG. 1 where a partial perspective view of four exemplary embodiments of the sold surface material is shown, illustrating its composition and the apparatus is generally indicated by reference character 100. Material 100 comprises a first solid surface material 112 comprising an acrylic modified polyester resin with at least one natural mineral filler, and optionally at least one colorant and/or at least one granule type. First solid surface material 112 comprises a top surface 130 and at least one channel 110 cut into top surface 130 of cured first material 112. FIG. 1 shows four embodiments of material 100 which each include a different configuration of channels 110 which are cut into top surface 130 of material 112, that is first material embodiment 102, second material embodiment 104, third material embodiment 106, and fourth material embodiment 108. Channels 110 are cut by hand or by a CNC machine into the top surface of cured material 100 to a desired depth and can be cut to replicate grout lines or, if desired, channels 110 could be any desired design or pattern, such as a company logo or text. Material 100 is generally configured in the shape of a sheet of a desired size and configured to be adhered or attached to a surface such as a wall, floor or ceiling. It is further contemplated material may be configured and used as a countertop, work surfaces, windowsills, other molded products such as sinks, shower receptors, and bathroom accessories.

Figure 2:
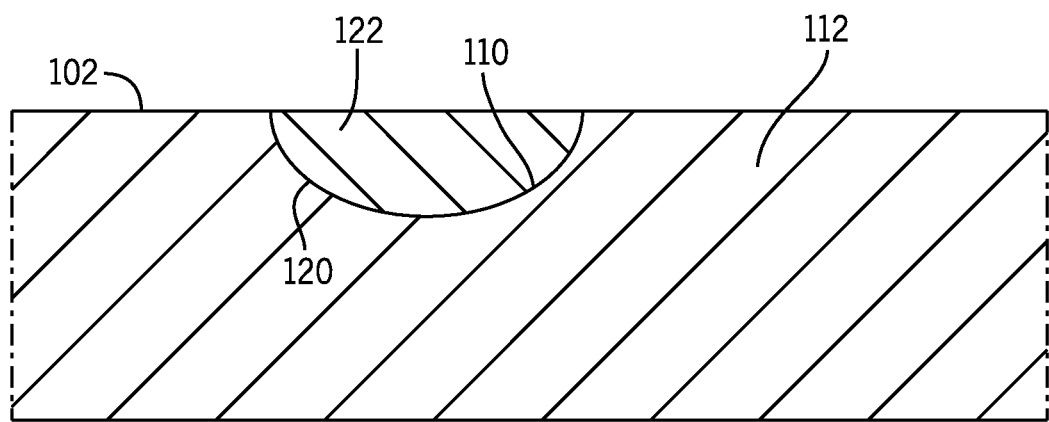
FIG. 2 is a partial cross-section view along line 2-2 of a portion material 106 of FIG. 1.

Turning to FIG. 2, a partial cross-sectional view along line 2-2 of third embodiment material 106 of FIG. 1 is shown. Channel 110 is defined by a bottom channel surface 120 which is usually semi-spherical, square or "V" shaped but may be any shape, width, length and/or depth desired and capable of being cut into first material 112. Material 100 (or in the present case third material embodiment 106) further comprises a second solid surface material 122 comprising an acrylic modified polyester resin, at least one natural mineral filler, at least one colorant and/or at least one granule type, wherein the at least one colorant and/or at least one granule type are/is different than the colorant and/or granule type of first material 112. Second solid surface material may completely fill channel 110 to be level or flush with the top surface of material 106. Such a configuration allows the top surface of material 106 and second solid surface material 122 to appear contiguous for easy cleaning and sanitation.

Figure 3:
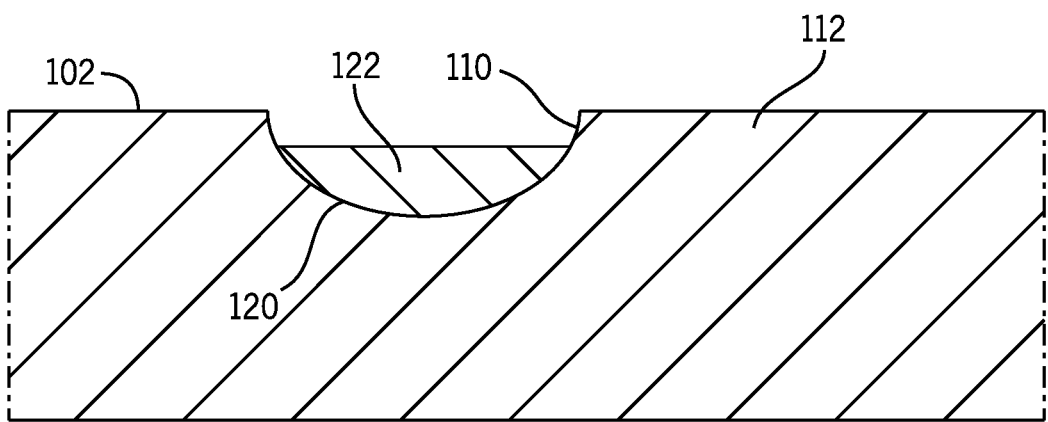
FIG. 3 is a partial cross-section view along line 2-2 of a portion of an alternative embodiment of material 106 of FIG. 1.

Turning to FIG. 3, a partial cross-sectional view along line 2-2 of an alternative embodiment of third material embodiment 106 of FIG. 1 is shown. In this embodiment second solid surface material 122 may partially fill channel 122 to a desired level, giving the appearance as if second material 122 is grout and the top surface 130 of third material embodiment 106 is a plurality of tiles or bricks (or a portion of a larger section thereof). As such, material 100 may be used to simulate hand laid and grouted tiles but also provide the time and cost savings of tileboard, which is easily mountable on a surface such as a wall or floor via an adhesive, all while also maintaining the entire material as a single solid surface product, but varying in color, appearance, and/or texture between first material 112 and second material 122. In addition, first material 112 and second material 122 are naturally anti-microbial, ensuring a more sanitary surface. Further, damage to material 100 can be fixed simply by applying additional first material 112 and/or second material 122 while in liquid form (described below) and then allowing it to cure, there is no need to replace individual tiles as well as grout by an experienced tile installer.

Figure 4:
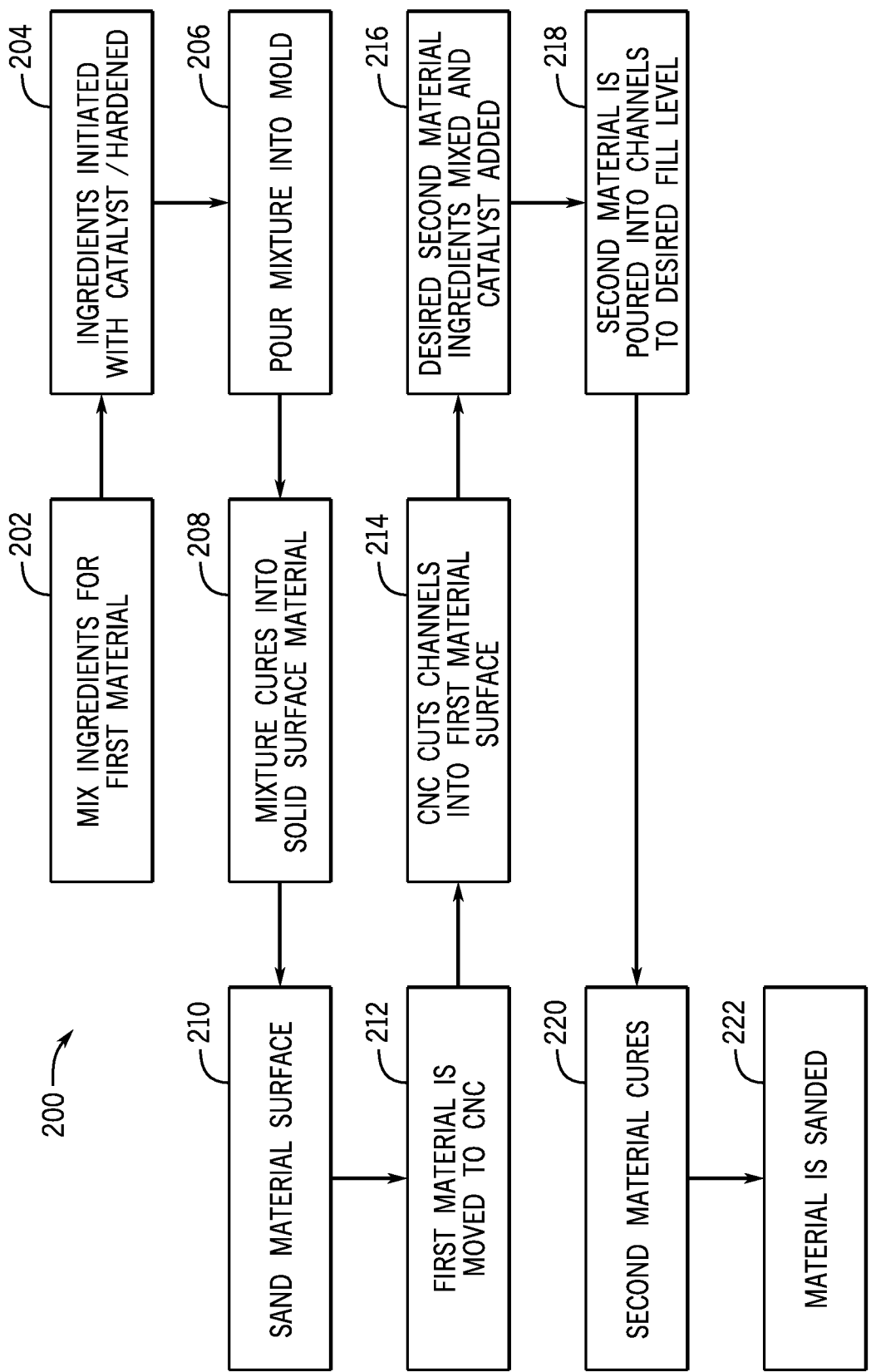
FIG. 4 is a flowchart of the manufacturing process of the present invention.

Turning to FIG. 4, a flowchart of the manufacturing process 200 of material 100 is shown. First, step 202 includes adding a first quantity of first ingredients for first material 112 to the bowl of a mixer fitted with a vacuum pump and an auger. The ingredients comprise a resin, an inert filler, and colorants/pigments and/or granules. The resin may be any isophthalic or orthophthalic resin while the filler may be clay or alumina trihydrate ($Al_2O_3 \cdot 3H_2O$). The colorant/pigment may be liquid or solid (preferably powdered) and may be any desired color shade (or mix of color shades). Granules are solid and range between about 0.00049 inches to about 0.50 inches in diameter. Exceedingly small granules act like a powdered solid (closer to 0.00049 inches) and larger granules (closer to 0.5 inches) influence the color of the end product by giving first material 112 the appearance of an asymmetrical pattern. Granules are a preferably solid surface material(s) with a specific gravity the same as or similar to the specific gravity of material 100 to ensure the final material 100 is homogenous throughout which ensures consistent color and/or granule distribution throughout the entire sheet of material 100. Granules can be made of a variety of materials including acrylic. The preferred specific gravity for first material and granules is each 1.5 to 2.1. An example of a standard recipe would be 34% resin, 65% inert filler and 1% pigments and/or granules by weight. However, the quantity of pigments and/or granules can range between about 0.2% and 18% of the total mixture by weight, with the percentage of inert filler being reduced by the same amount the pigment and/or granule is increased. Likewise, the percentage of resin can range between 33% and 40% with proportional changes mirrored in the inert filler and pigment/granules. After the ingredients are placed in the mixing bowl, the bowl is spun without a vacuum for 2-6 minutes and then the sides of the bowl are scraped. Next, the bowl is spun under a vacuum for another 8-15 minutes to remove porosity/air from the mixture and then the sides of the bowl is scraped again to ensure a homogenous mixture is formed. Next, as first material 112 (and second material 122) is a thermoset product, in step 204, a first catalyst or hardener is added to the mixture in a quantity of about 1.5% of the resin weight. An example of a catalyst would be methyl-ethyl-ketone peroxide. Next, the first catalyst is distributed into the mixture by lifting the mixing auger on the mixer out of the mixing bowl and lowering it back into the bowl (known as bouncing), at least 5 times before scraping the sides of the bowl again and then spinning the entire mixture with the first catalyst under vacuum again for 2-4 minutes to remove styrene produced when the catalyst is added. If styrene is not removed, the end product is more brittle, the color is different than desired, and the finished material has more porosity. Next in step 206, the mixture is poured into a mold to a desired thickness to create a sheet of material 100 and the mold may, but is not required, to be vibrated for up to 2 minutes to ensure even distribution of the mixture in the mold. The mold may be any desired shape, such as a rectangle or standard sheet shape with sides to maintain the poured mixture. Next, in step 208, the poured mixture in the shape of a sheet is left alone for at least 40 minutes to set and cure. After at least 40 minutes, in step 210, the sheet of solid surface material 112 is removed from the mold and sanded, preferably wide-belted, to remove extra and un-even material to a thickness of preferably about 0.3125 inches. Next, in step 212, the sheet is moved to a CNC machine and then in step 214, channels 110 are cut into the top surface 130 of the sheet of first material 112 per a design pre-loaded into the CNC machine software. Next, any excess material is removed from the newly formed channels 110 and step 216 follows, where a second quantity of a second set of ingredients for a second material 122 is mixed just like first material 112 described above (although at least the colorant is different), once a second catalyst (which may be the same catalyst as used in the first mixture, or may be different) is added to and mixed with second ingredients of second material 122 and then the second material 122 ingredients are poured or forced into channels 122 to the desired level. Next, according to step 220, second material 122 is then left for at least 40 minutes to cure. Finally, in step 222, the sheet of cured first material 112 with cured second material 122 is sanded to the desired specifications and thickness, preferably about 0.25 inches.

While the present invention has been described above in terms of specific embodiments, it is to be understood that the invention is not limited to these disclosed embodiments. Many modifications and other embodiments of the invention will come to mind of those skilled in the art to which this invention pertain, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings. Likewise, where this document refers to technologies that would be apparent or known to one of ordinary skill in the art, such technologies encompass those apparent or known to the skilled artisan now or at any time in the future.

The invention claimed is:

1. A solid surface material comprising:
   a first solid surface material configured as a sheet with at least one channel cut into the top surface, wherein the first solid surface material is comprised of an acrylic modified polyester resin, at least one natural mineral filler, and at least one colorant and/or at least one granule; and
   a second solid surface material comprised of an acrylic modified polyester resin, at least one natural mineral filler, and at least one colorant and/or at least one granule which at least partially fills the at least one channel,
   wherein the at least one colorant and/or at least one granule of the first material is different than the at least one colorant and/or at least one granule of the second material.

2. The first solid surface material of claim 1 wherein the acrylic modified polyester resin is either isophthalic or orthophthalic.

3. The first solid surface material of claim 1 wherein the natural mineral filler comprises clay or alumina trihydate.

4. The second solid surface material of claim 1 wherein the acrylic modified polyester resin is either isophthalic or orthophthalic.

5. The second solid surface material of claim 1 wherein the natural mineral filler is clay or alumina trihydate.

6. The first solid surface material of claim 1 wherein the at least one granule is between 0.0045 and 0.25 inches in diameter.

7. The first solid surface material of claim 1 wherein the colorant and/or granule is between 0.2% and 18% of the total mixture weight.

8. The at least one channel of claim 1 wherein the channel is semi-spherical shaped.

9. The at least one channel of claim 1 wherein the channel is "V" shaped.

10. A method for manufacturing a solid surface material comprising: adding a first quantity of a first resin, a first inert filler, and a first colorant and/or first granules to a container to create a first mixture; mixing the first mixture; mixing a first catalyst into the first mixture; pouring the first mixture into a mold; allowing the first mixture to cure; removing the cured first mixture from the mold and sanding it; cutting at least one channel into the top surface of the cured first mixture; adding a second quantity of a second resin, a second inert filler, and a second colorant and/or second granules to form a second mixture; mixing a second catalyst into the second mixture; filling the at least one channel of the cured first mixture with the second mixture to a desired level; and allowing the second mixture to cure.

11. The method for manufacturing a solid surface material of claim 10 wherein the first colorant and the second colorant are different.

\* \* \* \* \*